(12) United States Patent
Smith et al.

(10) Patent No.: US 10,392,775 B2
(45) Date of Patent: Aug. 27, 2019

(54) LIQUID PUMP WITH A PASSIVE FILTRATION SYSTEM FOR DREDGING AND WATER FILTRATION

(71) Applicant: Fort Lewis College, Durango, CO (US)

(72) Inventors: Ryan N Smith, Durango, CO (US); Michael Fitzpatrick, Durango, CO (US)

(73) Assignee: Fort Lewis College, Durango, CO (US)

( * ) Notice: Subject to any disclaimer, the term of this patent is extended or adjusted under 35 U.S.C. 154(b) by 235 days.

(21) Appl. No.: 15/640,868

(22) Filed: Jul. 3, 2017

(65) Prior Publication Data

US 2019/0003150 A1 Jan. 3, 2019

(51) Int. Cl.
| | | |
|---|---|---|
| *E02F 3/94* | (2006.01) | |
| *F04F 5/24* | (2006.01) | |
| *F04F 5/46* | (2006.01) | |
| *E02F 3/92* | (2006.01) | |
| *B01D 29/33* | (2006.01) | |
| *F04F 1/20* | (2006.01) | |

(52) U.S. Cl.
CPC ............ *E02F 3/94* (2013.01); *B01D 29/33* (2013.01); *E02F 3/9243* (2013.01); *F04F 1/20* (2013.01); *F04F 5/24* (2013.01); *F04F 5/466* (2013.01)

(58) Field of Classification Search
CPC .. B01D 29/0097; B01D 29/014; B01D 29/35; B01D 29/11; B01D 29/114; B01D 29/58; B01D 29/33; B01D 35/02; B01D 35/26; B01D 2201/20; B01D 35/204; B01D 35/206; F04B 53/20; E02F 3/88; E02F 3/8858; E02F 3/90; E02F 3/9293; E02F 3/9243; E02F 3/94; E02F 5/28; F04F 1/20; F04F 5/24; F04F 5/466
USPC ............ 210/258, 406, 416.1, 416.2, 170.02, 210/170.04, 170.09, 170.11, 338, 459, 210/497.01, 497.3; 37/317, 318, 320; 119/216
See application file for complete search history.

(56) References Cited

U.S. PATENT DOCUMENTS

| | | | | |
|---|---|---|---|---|
| 1,574,783 | A * | 3/1926 | Evert ................... | A01K 63/042 119/263 |
| 3,549,015 | A * | 12/1970 | Willinger ............... | A01K 63/10 210/416.2 |
| 3,662,889 | A * | 5/1972 | Takarabe ............. | A01K 63/045 210/167.01 |
| 3,826,371 | A * | 7/1974 | Adamson ............. | A01K 63/045 15/1.7 |
| 3,841,999 | A * | 10/1974 | Bennett et al. ...... | A01K 63/045 210/167.22 |

(Continued)

OTHER PUBLICATIONS

International Search Report and Written Opinion, International Application No. PCT/US18/39405, dated Sep. 12, 2018, 14 pages.

*Primary Examiner* — Jamie L McGowan
(74) *Attorney, Agent, or Firm* — Elevated IP, LLC

(57) ABSTRACT

The liquid pump includes an inner and an outer tube. The inner tube can have a distal end that is positioned within an interior volume of the outer tube. A conical filter is on the distal end of the inner tube. A gas pump provides compressed air which is output through a plurality of inner tube holes on an inner surface of the inner tube on a distal portion of the inner tube and a plurality of annular space holes which are adjacent to an annular space between the inner tube and the outer tube.

20 Claims, 5 Drawing Sheets

(56) References Cited

U.S. PATENT DOCUMENTS

| | | | | |
|---|---|---|---|---|
| 4,053,181 A | * | 10/1977 | Saito | E02F 3/88 |
| | | | | 299/9 |
| 4,391,468 A | * | 7/1983 | Funk | E02F 3/90 |
| | | | | 299/8 |
| 4,424,858 A | * | 1/1984 | Elliott | E21B 43/121 |
| | | | | 166/116 |
| 4,733,449 A | * | 3/1988 | Spearman | B01D 15/00 |
| | | | | 141/340 |
| 5,139,659 A | | 8/1992 | Scott | |
| 5,791,290 A | | 8/1998 | Mueller | |
| 6,499,432 B2 | * | 12/2002 | Ogawa | A01K 63/006 |
| | | | | 119/264 |
| 7,363,878 B2 | * | 4/2008 | McRobert | A01K 63/04 |
| | | | | 119/245 |
| 8,678,514 B2 | * | 3/2014 | Efthymiou | E02F 3/8866 |
| | | | | 299/8 |
| 9,193,616 B2 | * | 11/2015 | Al-Anzi | C02F 7/00 |
| 2005/0242450 A1 | | 11/2005 | Witheridge | |
| 2012/0308407 A1 | | 12/2012 | Badr et al. | |
| 2015/0108054 A1 | | 4/2015 | Bleth et al. | |

\* cited by examiner

LIQUID PUMP WITH A PASSIVE FILTRATION SYSTEM FOR DREDGING AND WATER FILTRATION

STATEMENT REGARDING FEDERALLY SPONSORED RESEARCH OR DEVELOPMENT

This invention was made with government support under N00014-16-1-2634 awarded by the Office of Naval Research, 1531322 awarded by the National Science Foundation, and P382C160004 awarded by the US Department of Education. The government has certain rights in the invention.

BACKGROUND

An air-lift pump causes convection of water by injecting compressed air into a water column at depth. The introduction of air into water at depth decreases the average local density of the water and the surrounding hydrostatic pressure caused by the denser water forces the less dense air/water mixture upwards.

SUMMARY OF THE INVENTION

The annular air-lift filtration system was developed to enable suction dredging practitioners to collect sediment while not collecting larger aggregate, debris and other marine life. The sea life filtering effect is an observable aerodynamic effect where a fluid continues to follow a curved surface for a period of time in a direction away from the initial direction of flow. The annular air-lift pump was designed to utilize a first air-lift pump to induce flow across the surface of the conical filter and a second air-lift pump to establish a pressure gradient that causes water to flow through the conical filter. Coanda filters have been utilized in the past to filter clean water from sediment laden water. In those applications the acceleration of gravity drives the filtration system.

In this application, a liquid pump can include an outer tube defining an outer tube volume and an inner tube which is positioned within the inner cylindrical volume. The inner tube and a filter on a distal end of the inner tube are located within the outer tube volume. The filter can be located within the outer tube volume recessed from the lower edge.

The liquid pump can include a gas pump which can compress air which is output through a plurality of inner tube holes on an inner surface of the inner tube on a distal portion of the inner tube and a plurality of annular space holes which are adjacent to an annular space between the inner tube and the outer tube. The compressed air mixes with the liquid causing the air-water mixture to be less dense than the ambient liquid. The air-water mixture is displaced upwards through the inner tube and the outer tube by the surrounding liquid of higher density which creates a liquid vacuum at the lower ends of the inner and outer tubes.

When the pump is operating, liquid is sucked into the lower end of the pump. Solids such as sediment and sea life may be in the liquid flow. The solids that are smaller than the filter screen can pass through the filter and flow through the inner tube while the solids that are larger than the filter screen can pass across the surface of the filter and flow through the annular volume between the outer tube and the inner tube. The sea life can be returned to the ambient water.

DETAILED DESCRIPTION

Figure 1:
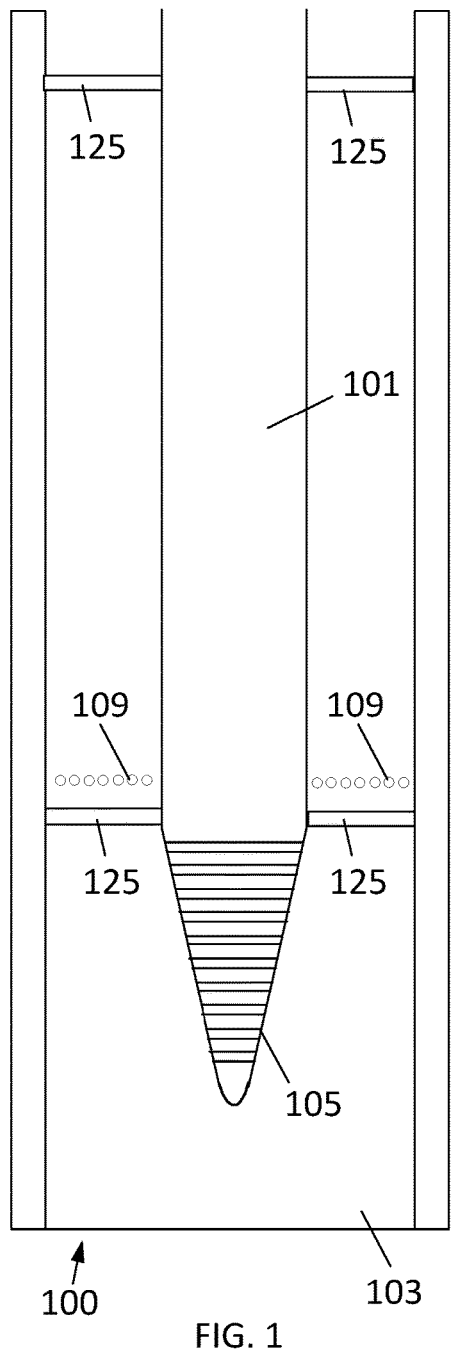
FIGS. 1 and 2 illustrate partial cross section views of an embodiment of a liquid pump.

With reference to FIG. 1 a partial cross sectional view of a liquid pump 100 is illustrated. This embodiment of the pump 100 includes an outer tube 103 and an inner tube 101. The inner surface of the outer tube 103 and the outer surface of the inner tube 101 are shown. The outer tube 103 and the inner tube 101 can be cylindrical structures, which can have a circular cross section. In other embodiments, the cross sections of the outer tube 103 and the inner tube 101 can be any other geometric shape such as hexagon, square, rectangle, etc. The inner tube 101 can be coaxially and centrally aligned with outer tube 103. The inner tube 101 can be held within the outer tube 103 with stand offs 125 which can be thin structures that the liquid can flow around. The lower edge of the outer tube 103 can be the distal end of the pump 100.

Figure 2:
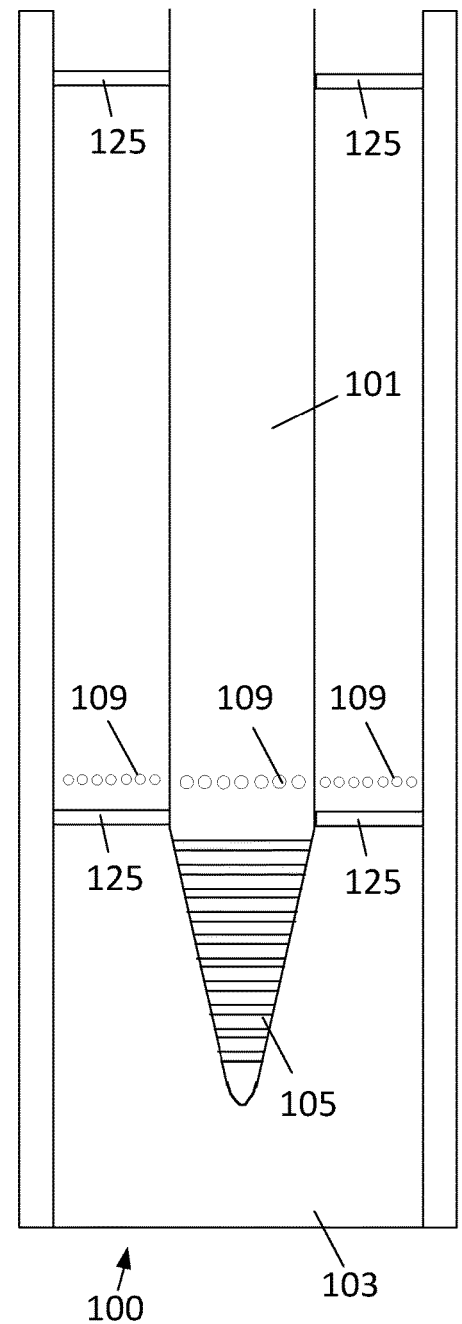

With reference to FIG. 1, the inner diameter of the outer tube 103 can have a plurality of annular gas holes 109. With reference to FIG. 2, the inner diameter of the outer tube 103 and the outer diameter of the inner tube 101 can have a plurality of annular gas holes 109. In other embodiments, the annular gas holes 109 may only be present on the outer diameter of the inner tube 101. A gas pump (not shown) can be coupled to the pump 100 to direct pressurized air to the annular gas holes 109. The annular gas holes 109 are used to direct pressurized gas into the annular space between the inner tube 101 and the outer tube 103. The pump 100 can be placed in a liquid and a gas pump (not shown) can be coupled to the pump 100 to direct pressurized air to the annular gas holes 109. The gas can cause the density of the fluid in the annular volume to be less dense than the surrounding liquid resulting in an upward flow of liquid around the filter 105 and through the annular space between the outer tube 103 and the inner tube 101.

A filter 105 can be placed on the distal end of the inner tube 101. In an embodiment, the filter 105 is a conical filter. In an embodiment, the filter 105 is within a cylindrical volume. The distal end of the filter 105 can be more proximal than the distal edge of the outer tube 103. The recessed position of the filter 105 within the outer tube 103 can protect the filter 105 from damage as the distal end of the pump 100 is moved against the sea floor when the pump 100 is used for dredging. In an embodiment, the distal edge of the outer tube 103 can be worn as the pump 100 slides against the sea floor. The outer tube 103 can be a modular design and the distal edge of the outer tube 103 can be a replaceable structure that can be removed when it is worn down.

Figure 3:
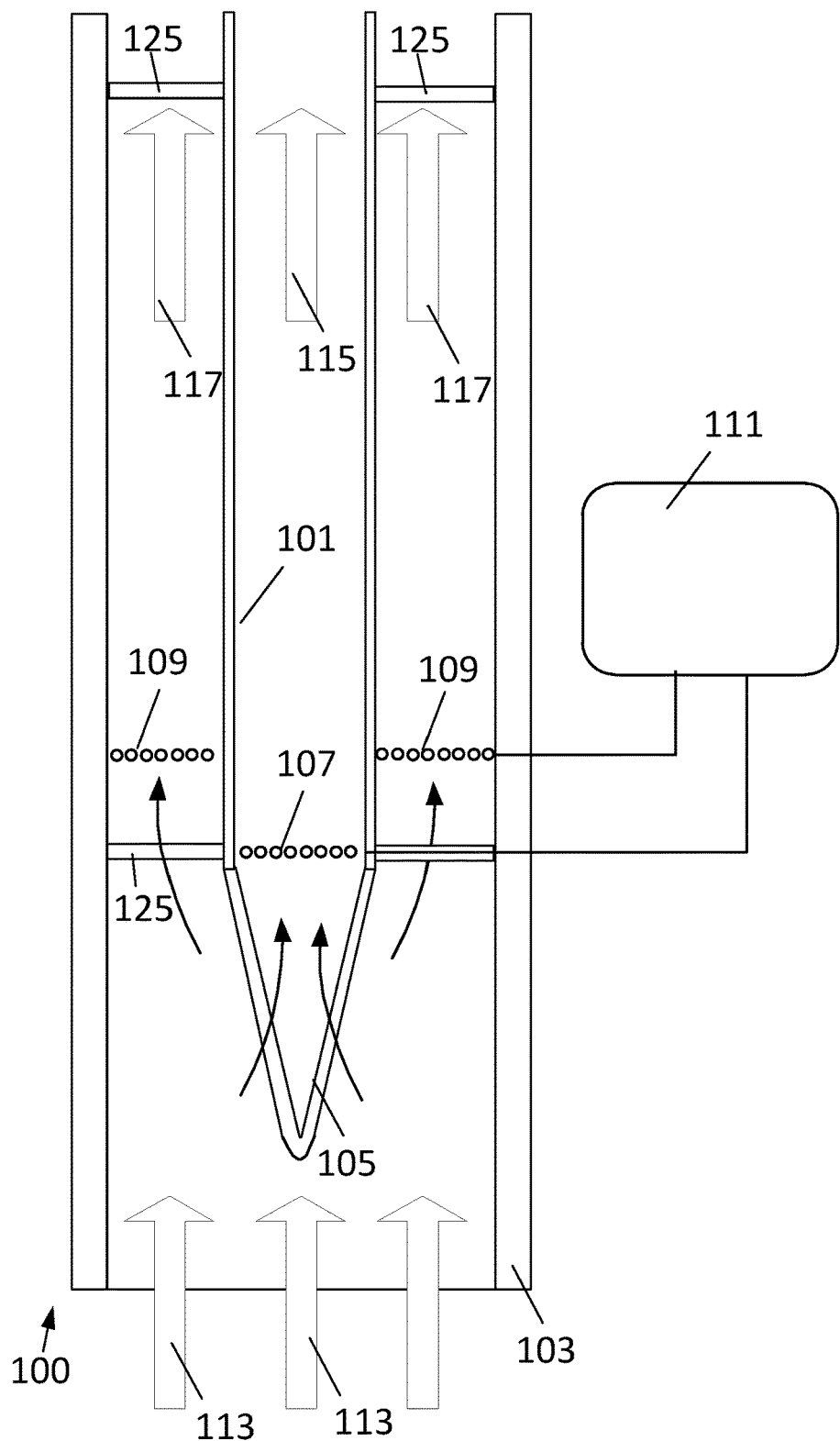
FIG. 3 illustrates flow paths through a cross section of an embodiment of a liquid pump.

With reference to FIG. 3, a cross section side view of the pump 100 is illustrated showing the inner surface of the outer tube 103 and the inner surface of the inner tube 101. The inner tube 101 can include a plurality of inner tube gas holes 107. In an embodiment, the plurality of inner tube gas holes 107 can be more distally positioned on the pump 100 than the annular gas holes 109. A gas pump 111 is coupled to both the inner tube gas holes 107 and the annular gas holes 109. The pump 100 can be placed in a liquid and the gas pump 111 can direct pressurized air to the inner tube gas holes 107 and the annular gas holes 109. The gas pump 111 can provide gas at a pressure between 5 to 120 PSI or higher. The gas pressure produced by the gas pump 111 must be higher than the liquid head pressure based upon the depth of the pump 100 in the liquid. For fresh water the head pressure calculation can be Head Pressure (psi)=Depth (feet)/2.31 (feet/psi). For a depth of 150 feet, the head pressure is 65 psi.

When the pump 100 is placed in an upright position or angled upward, the lower density gas will create bubbles which will travel from a distal end of the pump 100 towards a proximal end of the pump. More specifically, the gas bubbles from the annular gas holes 109 will travel to the proximal end of the outer tube 103 and the gas bubbles from the inner tube gas holes 107 will travel towards the proximal end of the inner tube 101. The gas causes the density of the fluid in the inner tube 101 to be less dense than the surrounding liquid resulting in an upward flow of liquid through the filter 105 and the inner tube 101. Simultaneously, the pressurized gas causes density of the fluid in the annular volume to be less dense than the surrounding liquid resulting in an upward flow of liquid around the filter 105 and the inner tube 101 through the outer tube 103.

In an embodiment, the gas flow rate of gas into the inner tube and the annular space of the pump can be controlled. The gas flow can be increased to increase the liquid flow rate through the pump 100. In some embodiments, the gas flow rates between the inner tube and the annular space can be adjusted to alter the amount of liquid flowing through the filter. For example, the gas flow into the inner tube can be increased to increase the liquid flow rate through the filter and decreased to reduce the liquid flow rate through the filter. The gas flow rates can also be based upon the size of the pump with a larger sized pump requiring a higher gas flow rate. In an embodiment the outer diameter of the outer tube 103 can be between 4 inches and 12 inches and the outer diameter of the inner tube 101 can be between 3 inches and 6 inches. However, in other embodiments, any suitable inner and outer tube diameters can be used with the pump. The length of the outer tube 103 can be 2 feet or greater in length.

Figure 4:
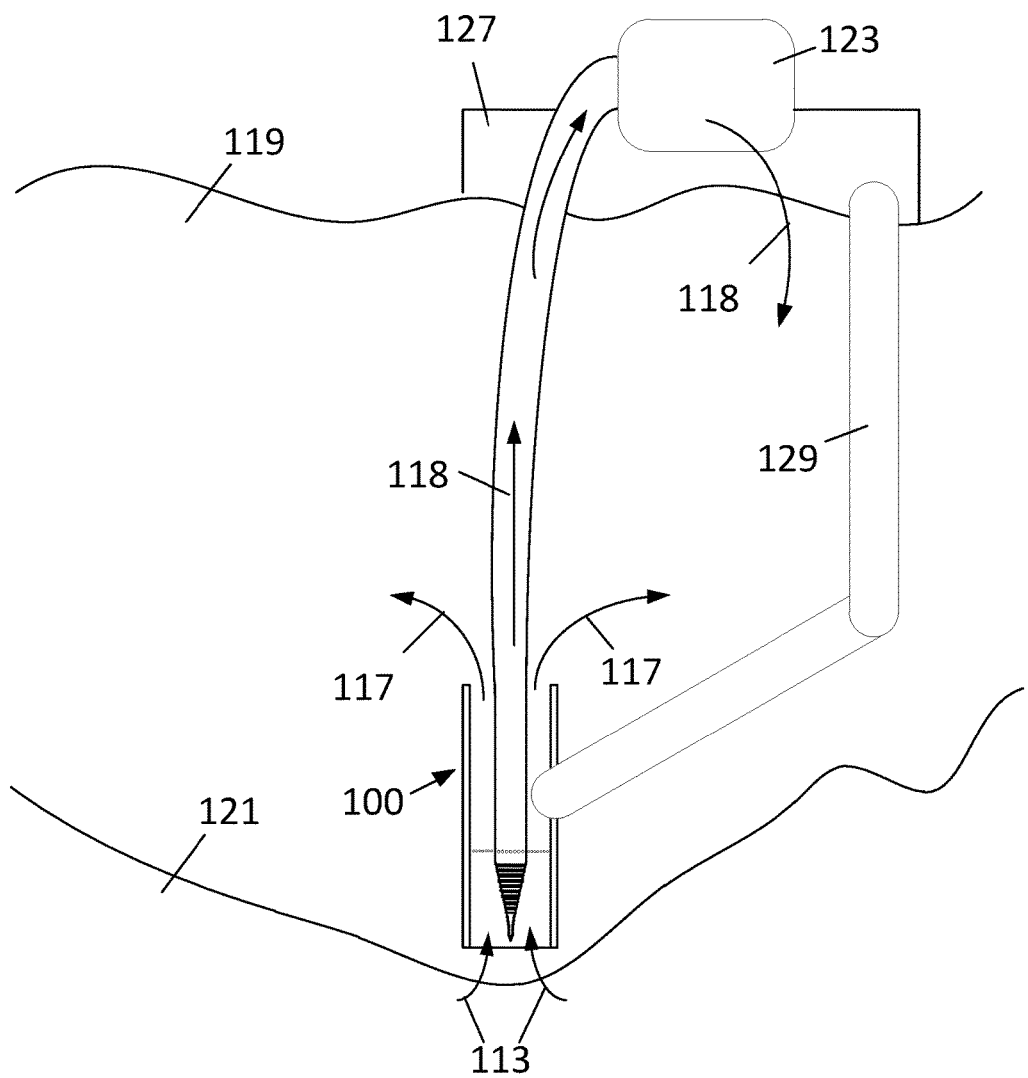
FIG. 4 illustrates an embodiment of a liquid pump used to pump sediment from the sea floor.

The pump 100 can be used for dredging. With reference to FIG. 4, the pump 100 is placed in a body of water 119 which can be a lake, bay, ocean or any other open water. The pump 100 can be placed against or near the sea floor 121. A pressurized gas such as air can be pumped into the pump 100 and gas bubbles can be emitted from the inner tube gas holes 107 and the annular gas holes 109. The acceleration of water is induced through the pressure gradient established by varying the air pressures in the inner tube 101 and annular space between the inner tube 101 and the outer tube 103. This acceleration drives the inlet water with entrained sediment 113 through the pump 100. Some of the water, sediment and sea life 117 will flow over the conical filter through the annular space and exit the proximal end of the outer tube 103. This water, sediment and sea life 117 can be returned to the body of water 119. In contrast, water and sediment 118 that is smaller than the filter openings can flow through the filter 115 into the inner tube 101. The filter 115 can prevent sea life from entering the inner tube 101. In this embodiment, the inner tube 101 is a flexible structure that extends to the upper surface of the body of water 119. The output of the inner tube 101 can be a liquid solid filter 123 that is on a floating barge 127. The water 118 can be returned to the body of water 119. The sediment removed from the water 118 can be captured by the liquid solid filter 123 and subsequently moved to an area away from the dredging area.

In an embodiment, the pump 100 can be coupled to a robotic arm 129 which can position the distal end of the pump 100. The robotic arm 129 can be coupled to the barge 127 or other vessel and positioned at the locations of the sea floor 121 where dredging is needed. The robotic arm 129 can be used with a depth sensor to properly position the pump 100 directly over the sea floor 121 at the location where dredging is needed. In an embodiment, the pump should be submerged 5 feet or more to create a sufficient pressure differential to allow the pump 100 to properly function. The pump 100 may function better when the pump 100 is placed lower in the water 119.

Figure 5:
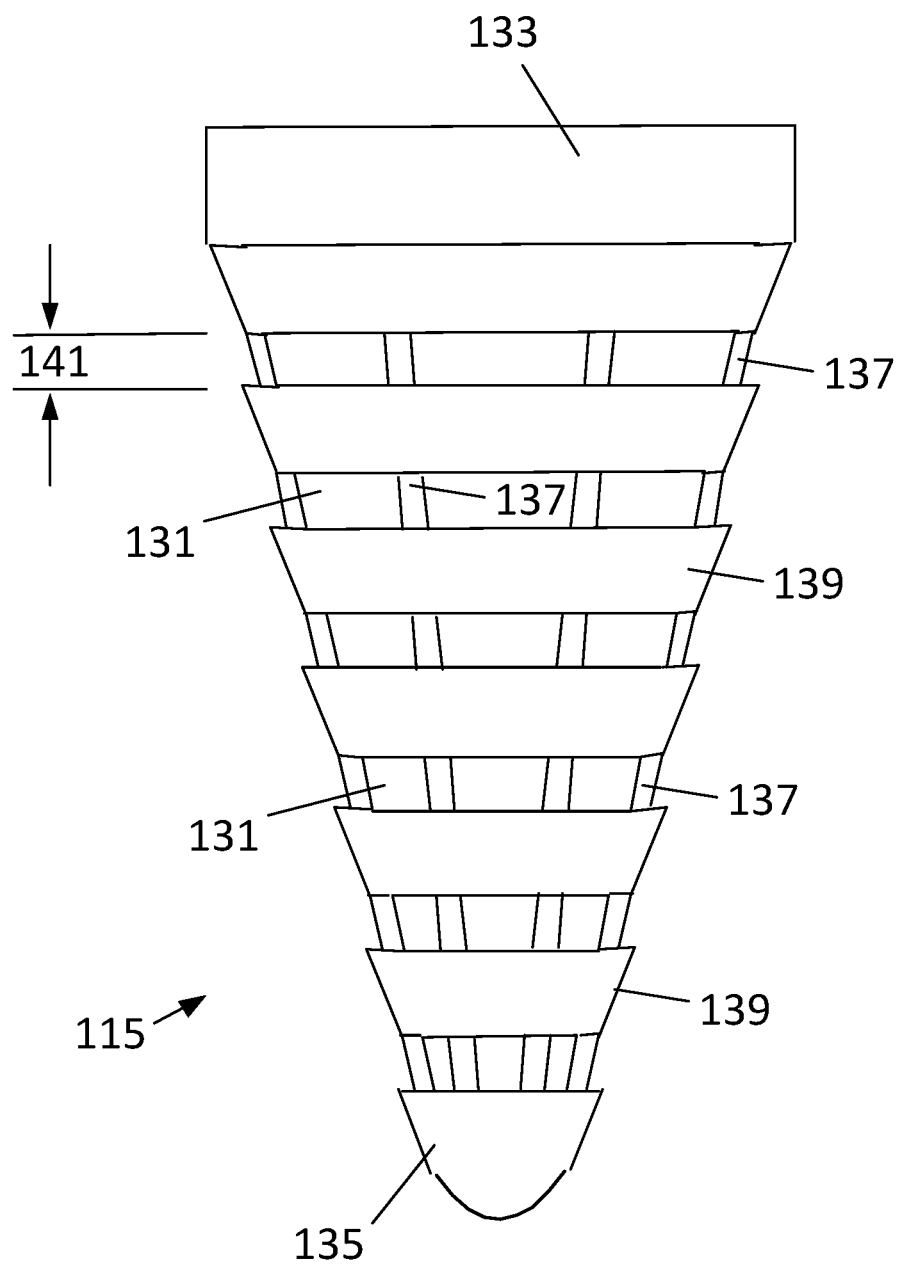
FIG. 5 illustrates an embodiment of a conical filter.

With reference to FIG. 5, a side view of an embodiment of a conical filter 115 is illustrated. In an embodiment, the filter 115 can be a conical Coanda filter which can work with high volume flow rates. The Coanda effect creates a change in pressure at the filter surface, which allows the water to cling to the filter surface as the water flows over the surface. The Coanda effect can cause the sediment laden water to follow the curvature of the filter rings flowing through the filter and collecting sediment.

In the illustrated embodiment, the filter 115 has a plurality of circular slots 131 that surround the filter 115. The slots 131 are substantially perpendicular a center axis of the filter 115. The filter 115 can include axial ribs 137 that are parallel to the center axis of the filter 115 and the outer surface of the conical filter 115. The axial ribs 137 connect solid surfaces 139 of the filter 115. The slots 131 can have widths 141 that can be sized to allow sediment to pass through the filter 115, but prevent larger objects such as fish, larger aggregate and debris from passing through the filter 115. More specifically, the spacing of the ring slots 131 of the filter 115 can be configured to exclude marine life larger than the ring slot 131 spacing while allowing particulate smaller than that size to be collected. This spacing of the ring slots 131 can be determined by the marine species present in a given locale. The slot widths 141 can be uniform for all of the slots 131 in the filter 115. The slot widths 141 can be between 2 millimeters and 10 millimeters. In an embodiment, the distal end of the filter 115 can be a rounded tip 135 that does not damage sea life that contacts the tip 135. The filter 115 can have a circular proximal end which can be coupled to the distal end of the inner tube of the pump.

Figure 6:
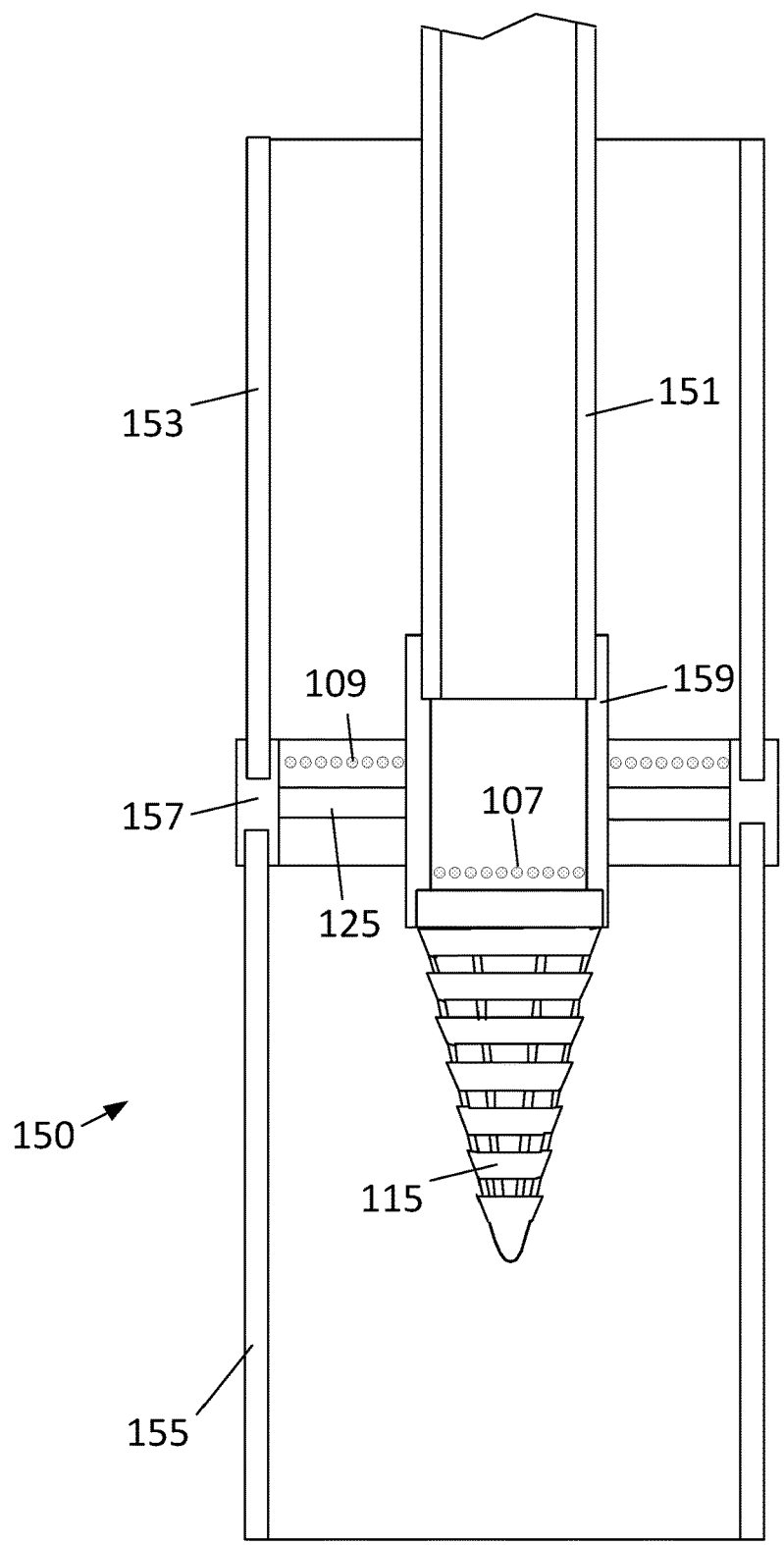
FIG. 6 illustrates a side cross section view of a modular embodiment of a liquid pump.

With reference to FIG. 6, in an embodiment, the pump 150 can have a modular design that can allow users to replace worn or damaged components. In the illustrated example, the outer tube can include an upper outer tube 153 and a lower outer tube 155 which can be coupled to a center gas manifold 157. The center gas manifold 157 can include standoffs 125 which connect the outer portion and the inner portion of the gas manifold 157. The inner portion of the gas manifold 157 can be coupled to the filter 115 and the inner tube 151. The center gas manifold 157 can be coupled to a gas pump (not shown) which can direct pressurized gas to the inner tube gas holes 107 and annular gas holes 109. If any of the pump components are worn or damaged, the component can be easily removed and replaced.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A liquid pump comprising:
    an outer tube defining an outer tube volume;
    an inner tube within the outer tube volume;
    a filter coupled to a distal end of the inner tube wherein the filter is within the outer tube volume;
    a plurality of inner tube holes, for emitting a gas, on a distal portion of an inner surface of the inner tube; and
    a plurality of annular space holes for emitting the gas to an annular space between the inner tube and the outer tube.

2. The liquid pump of claim 1 wherein the filter has a conical shape.

3. The liquid pump of claim 2 wherein the filter has a plurality of slots.

4. The liquid pump of claim 3 wherein surfaces of the filter between the slots form angles which are greater than an angle of the conical filter.

5. The liquid pump of claim 3 wherein the filter is hollow and defines an open inner conical volume.

6. The liquid pump of claim 1 wherein the gas is pressurized by a gas pump to a pressure between 5 to 120 PSI.

7. The liquid pump of claim 1 wherein a first cross sectional area of the inner tube is smaller than a second cross sectional area of the annular space between the inner tube and the outer tube.

8. The liquid pump of claim 1 wherein the plurality of inner tube holes are closer to a distal end of the liquid pump than the plurality of annular space holes.

9. A method for pumping a liquid comprising:
    providing a pump having an outer tube defining an outer tube volume, an inner tube within the outer tube volume, a filter coupled to a distal end of the inner tube wherein the filter is within the outer tube volume, a plurality of inner tube holes on a distal portion of an inner surface of the inner tube, and a plurality of annular space holes;
    placing the pump into the liquid with a distal portion of the pump deeper in the liquid than any other portion of the pump;
    pressurizing gas through the plurality of inner tube holes and the plurality of annular space holes; and
    pumping the liquid through the pump wherein a first portion of the liquid flows through the filter and the inner tube and a second portion of the liquid flows around the filter and through the annular space between the inner tube and the outer tube.

10. The method of claim 9 wherein the gas is pressurized by the gas pump to a pressure between 5 to 120 PSI.

11. The method of claim 9 wherein sediment in the first portion of the liquid flows through the filter and through the inner tube.

12. The method of claim 9 wherein fish in the second portion of the liquid, flow around the filter and through the annular space between the inner tube and the outer tube and the fish are returned to the liquid.

13. The method of claim 9 wherein objects in the second portion of the liquid flow around the filter and through the annular space between the inner tube and the outer tube.

14. The method of claim 9 wherein a first flow rate of the first portion of the liquid through the inner tube is less than a second flow rate of the second portion of the liquid through the annular space between the inner tube and the outer tube.

15. A method for dredging sediment under a body of water comprising:
    providing a pump having an outer tube defining an outer tube volume, an inner tube within the outer tube volume, a filter coupled to a distal end of the inner tube wherein the filter is within the outer tube volume, a plurality of inner tube holes on a distal portion of an inner surface of the inner tube, and a plurality of annular space holes;
    placing the pump into the body of water with a distal portion of the pump adjacent the sediment;
    pressurizing gas through the plurality of inner tube holes and the plurality of annular space holes; and
    pumping water through the pump wherein a first portion of the water flows through the filter and the inner tube and a second portion of the water flows around the filter and through the annular space between the inner tube and the outer tube.

16. The method of claim 15 wherein the gas is pressurized by the gas pump to a pressure between 5 to 120 PSI.

17. The method of claim 15 wherein the sediment in the first portion of the water flows through the filter and through the inner tube.

18. The method of claim 15 wherein fish in the second portion of the water, flow around the filter and through the annular space between the inner tube and the outer tube and the fish are returned to the water.

19. The method of claim 15 wherein objects in the second portion of the water flow around the filter and through the annular space between the inner tube and the outer tube.

20. The method of claim 15 wherein a first flow rate of the first portion of the water through the inner tube is less than a second flow rate of the second portion of the water through the annular space between the inner tube and the outer tube.

* * * * *